(12) United States Patent
Nakamura (10) Patent No.: US 12,097,758 B2
(45) Date of Patent: Sep. 24, 2024

(54) UTILITY VEHICLE

(71) Applicant: KAWASAKI MOTORS, LTD., Akashi (JP)

(72) Inventor: Yuki Nakamura, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 343 days.

(21) Appl. No.: 17/660,052

(22) Filed: Apr. 21, 2022

(65) Prior Publication Data

US 2023/0339309 A1    Oct. 26, 2023

(51) Int. Cl.
*B60K 13/02*    (2006.01)
*B60K 17/08*    (2006.01)
*F16H 57/04*    (2010.01)

(52) U.S. Cl.
CPC .............. *B60K 13/02* (2013.01); *B60K 17/08* (2013.01); *F16H 57/0416* (2013.01); *F16H 57/0489* (2013.01); *B60Y 2200/124* (2013.01)

(58) Field of Classification Search
CPC ........ B60K 13/02; B60K 13/04; B60K 13/06; B60K 17/08; B60K 17/06; B60K 17/04; F16H 57/0416; F16H 57/0489
See application file for complete search history.

(56) References Cited

U.S. PATENT DOCUMENTS 10,648,554 B2 *  5/2020  Kuhl ................... F16H 57/0489
10,697,532 B2 *  6/2020  Schleif ................. F16H 57/035
2004/0224806 A1  11/2004  Chonan

FOREIGN PATENT DOCUMENTS

JP      2004316857 A      11/2004
JP      2017194146 A   *  10/2017

* cited by examiner

*Primary Examiner* — John D Walters
(74) *Attorney, Agent, or Firm* — Alleman Hall & Tuttle LLP (57) ABSTRACT

A utility vehicle includes a continuously variable transmission and an intake duct including an intake passage that guides cooling air to an internal space of a CVT case of the continuously variable transmission. The intake duct includes: a peripheral wall that includes a downstream tube portion having an elongated section and defines the intake passage; a bridge that extends in a transverse direction of the downstream tube portion and couples a pair of opposing wall portions of the downstream tube portion to each other, the opposing wall portions being opposed to each other in the transverse direction; and two outflow openings that are defined by the peripheral wall and the bridge and are lined up in a longitudinal direction of the downstream tube portion.

14 Claims, 9 Drawing Sheets

UTILITY VEHICLE

BACKGROUND OF THE INVENTION

Field of the Invention

The present disclosure relates to a utility vehicle including a continuously variable transmission.

Description of the Related Art

JP2004-316857A discloses an all terrain vehicle including a continuously variable transmission. The continuously variable transmission includes a CVT mechanism and a CVT case that defines an internal space accommodating the CVT mechanism. An intake duct that guides outside air as cooling air to the internal space of the CVT case is connected to the CVT case.

SUMMARY OF THE INVENTION

A utility vehicle according to one aspect of the present disclosure includes: a continuously variable transmission including a CVT mechanism and a CVT case that defines an internal space accommodating the CVT mechanism, the CVT mechanism including a driving pulley, a driven pulley, and a belt wound around the driving pulley and the driven pulley; and an intake duct including an intake passage that guides cooling air to the internal space of the CVT case. The intake duct includes: a peripheral wall that includes a downstream tube portion having an elongated section and defines the intake passage; a bridge that extends in a transverse direction of the downstream tube portion and couples a pair of opposing wall portions of the downstream tube portion to each other, the opposing wall portions being opposed to each other in the transverse direction; and two outflow openings that are defined by the peripheral wall and the bridge and are lined up in a longitudinal direction of the downstream tube portion.

DESCRIPTION OF THE PREFERRED EMBODIMENTS

Figure 1:
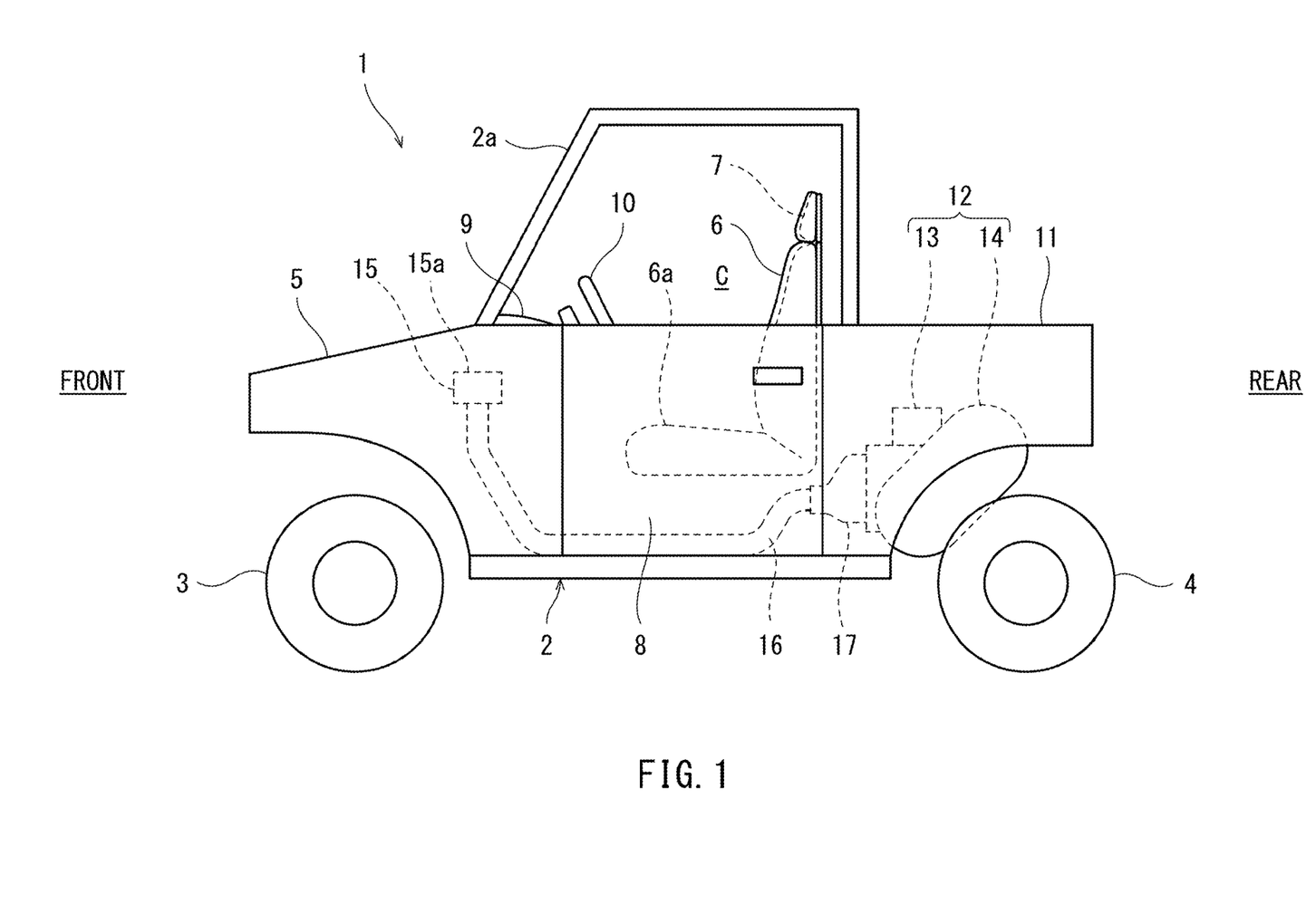
FIG. 1 is a schematic left side view of a utility vehicle according to an embodiment.

The concept of directions mentioned in the following description is based on directions of a utility vehicle 1 except for directions defined individually. FIG. 1 is a schematic left side view of the utility vehicle 1 according to the embodiment. As shown in FIG. 1, the utility vehicle 1 includes a vehicle body frame 2, a pair of left and right front wheels 3 supporting a front portion of the vehicle body frame 2, and a pair of left and right rear wheels 4 supporting a rear portion of the vehicle body frame 2. Tires of the front wheels 3 and the rear wheels 4 are balloon tires for uneven ground traveling. A space between the left and right front wheels 3 is covered with a hood 5 from above. A driver's seat 6 and a passenger seat 7 are arranged side by side behind the hood 5 and are supported by the vehicle body frame 2.

The vehicle body frame 2 is a pipe frame including pipes connected to each other. The vehicle body frame 2 includes, for example, a cabin frame 2a surrounding an occupant space C where the driver's seat 6 and the passenger seat 7 are arranged. Entrances that are opened or closed by side doors 8 are open at both sides of the occupant space C. The occupant space C surrounded by the cabin frame 2a is exposed to an outside. A dash panel 9 is arranged in front of the driver's seat 6 and the passenger seat 7. A steering wheel 10 is located at the dash panel 9 so as to project toward the driver's seat 6.

A cargo bed 11 defining a hollow loading space that is open to an outside is arranged behind the cabin frame 2a. A driving source assembly 12 is mounted behind the driver's seat 6 and under the cargo bed 11. The driving source assembly 12 includes a prime mover 13 and a continuously variable transmission 14. The prime mover 13 may be an internal combustion engine, an electric motor, or a combination thereof. The continuously variable transmission 14 is cooled in such a manner that outside air as cooling air flows inside the continuously variable transmission 14. In a side view of the vehicle 1, the continuously variable transmission 14 is arranged in front of and above the rear wheels 4. In the side view of the vehicle 1, the continuously variable transmission 14 is arranged diagonally such that a longitudinal direction of the continuously variable transmission 14 is directed rearward and upward.

An air cleaner 15 including an air take-in port 15a through which the outside air is taken in the air cleaner 15 is arranged in front of the steering wheel 10 and under the hood 5. The air cleaner 15 is arranged higher than a seat surface 6a of the driver's seat 6. An intake duct 17 that is a fluid duct is attached to the continuously variable transmission 14. The intake duct 17 is arranged lower than the seat surface 6a of the driver's seat 6. The intake duct 17 is arranged lower than the air take-in port 15a of the air cleaner 15. The intake duct 17 is arranged behind the driver's seat 6. An intake pipe 16 that connects the air cleaner 15 to the intake duct 17 extends in a front-rear direction while passing through a position lower than the seat surface 6a of the driver's seat 6. The air cleaner 15 may be arranged behind the occupant space C.

Figure 2:
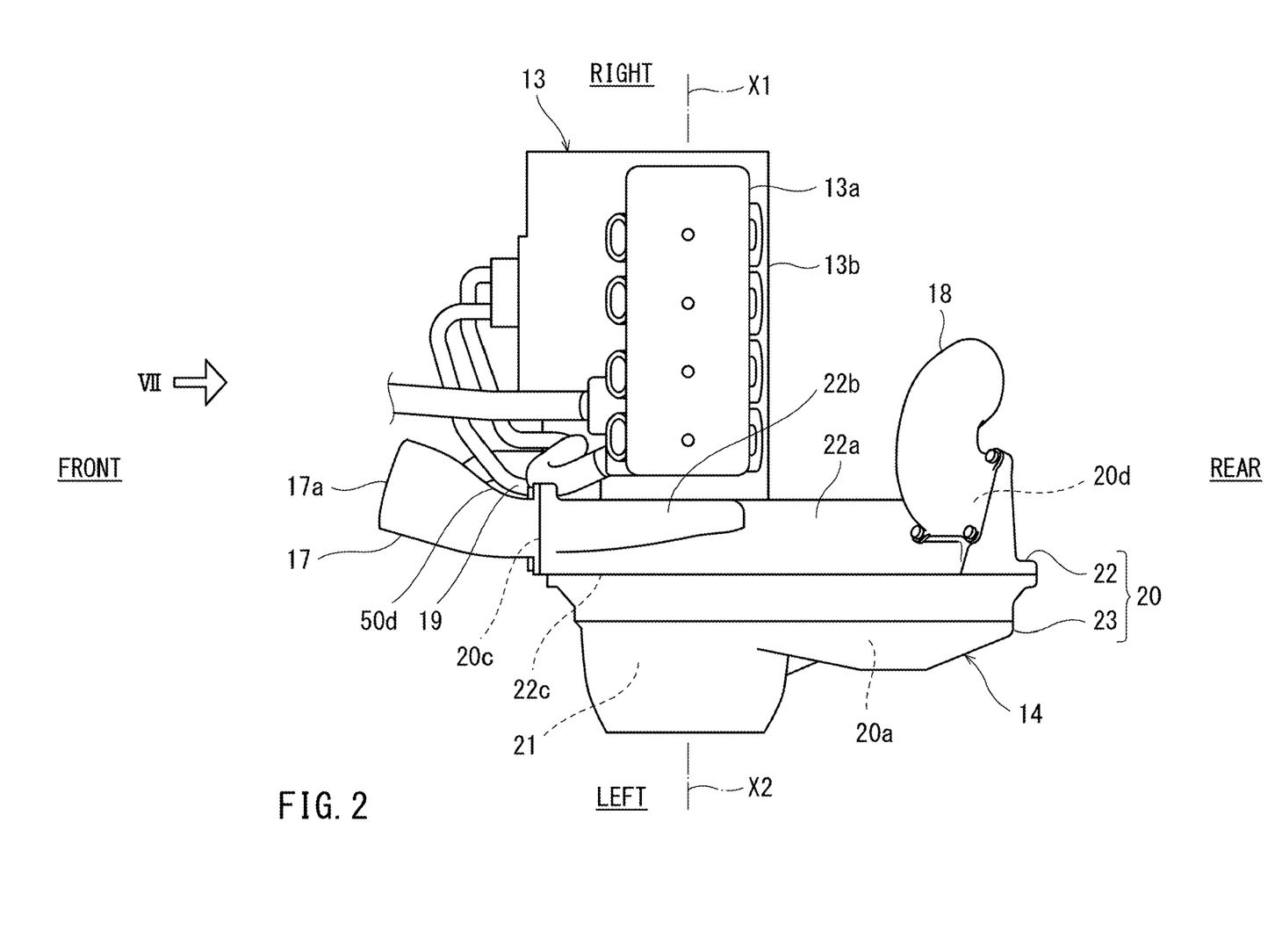
FIG. 2 is a plan view showing a continuously variable transmission, a prime mover, and the like of the utility vehicle of FIG. 1.
Figure 3:
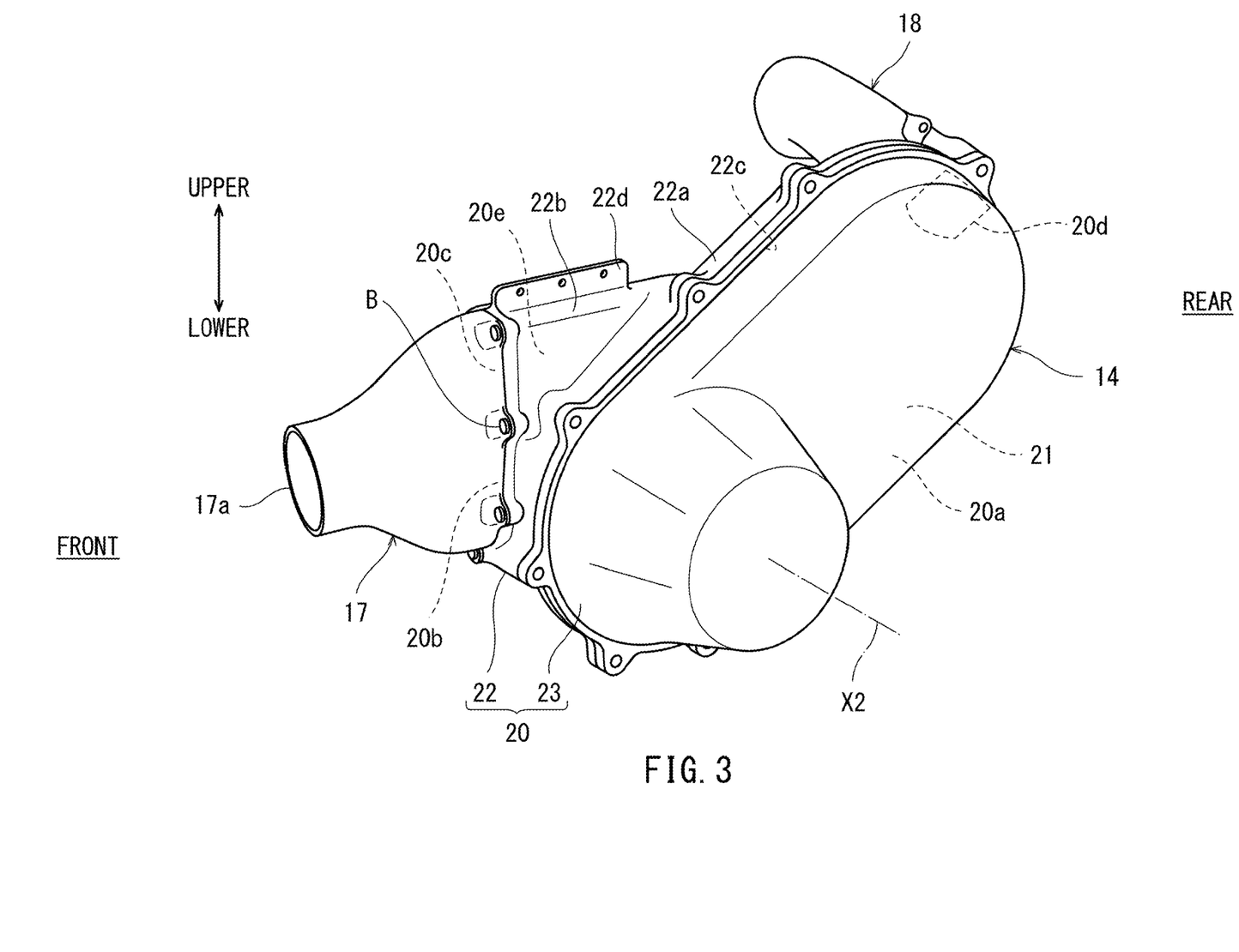
FIG. 3 is a perspective view showing the continuously variable transmission and the like of FIG. 2.

FIG. 2 is a plan view showing the continuously variable transmission 14, the prime mover 13, and the like of the utility vehicle 1 of FIG. 1. FIG. 3 is a perspective view showing the continuously variable transmission 14 and the like of FIG. 2. As shown in FIG. 2, the prime mover 13 is, for example, an internal combustion engine. The prime mover 13 includes a cylinder 13a and a crankcase 13b arranged under the cylinder 13a. A crank shaft 13c (see FIG. 4) coupled to a piston inside the cylinder 13a is accommodated in the crankcase 13b. An axis X1 of the crank shaft 13c (see FIG. 4) extends in a left-right direction of the utility vehicle 1. Various accessories 19 are connected to the prime mover 13. Examples of the accessories 19 include a water tube, an oil tube, a throttle body, an intake pipe, and an exhaust pipe. The continuously variable transmission 14 is adjacent to the prime mover 13 and is arranged at a lateral side of the prime mover 13. In the present embodiment, the continuously variable transmission 14 is arranged at a left side of the prime mover 13.

As shown in FIGS. 2 and 3, the continuously variable transmission 14 includes: a CVT case 20 that defines an internal space 20a; and a CVT mechanism 21 accommodated in the internal space 20a of the CVT case 20. The CVT case 20 includes a case main body 22 and a cover 23. The case main body 22 may be made of metal. The cover 23 may be made of metal or synthetic resin. The case main body 22 includes an opening 22c that is open toward one side (left side in the present embodiment) in a direction (hereinafter may be referred to as an axial direction X2) in which an axis X2 of a below-described driving pulley 27 (see FIG. 4) extends.

The cover 23 is attached to the case main body 22 by fasteners to close the opening 22c. The case main body 22 includes inflow openings 20b and 20c and an outflow opening 20d which communicate with the internal space 20a. The cooling air from an outside flows through the inflow openings 20b and 20c into the internal space 20a, and the cooling air in the internal space 20a is discharged through the outflow opening 20d to an outside. The intake duct 17 is connected to the inflow openings 20b and 20c, and an exhaust duct 18 is connected to the outflow opening 20d.

The case main body 22 includes a main body portion 22a and a projecting portion 22b that projects outward (forward in the present embodiment) from the main body portion 22a. The main body portion 22a has a recessed section and defines the internal space 20a together with the cover 23. The opening 22c closed by the cover 23 is formed at the main body portion 22a. The inflow openings 20b and 20c are formed at a tip side of the projecting portion 22b. The projecting portion 22b has a tubular shape and defines a guide passage 20e that connects the inflow openings 20b and 20c to the internal space 20a.

The projecting portion 22b projects forward from an upper surface of a front portion of the main body portion 22a, the upper surface being inclined rearward and upward. The projecting portion 22b has an elongated shape when viewed from front. A dimension of the projecting portion 22b in the upper-lower direction is longer than a dimension of the projecting portion 22b in the left-right direction. A dimension of the projecting portion 22b in the axial direction X2 is shorter than a dimension of the projecting portion 22b in a projecting direction (front-rear direction in the present embodiment). To be specific, a transverse direction of the projecting portion 22b when viewed from front is a direction along the axial direction X2. A fixing seat 22d including fastening holes is disposed at the projecting portion 22b. The fixing seat 22d is directly or indirectly fixed to the vehicle body frame 2 by fasteners.

The intake duct 17 is connected to a tip of the projecting portion 22b of the CVT case 20. The intake duct 17 guides the cooling air to the internal space 20a of the CVT case 20. The intake duct 17 has a shape that spreads in a flare shape as the intake duct 17 extends from an inflow opening 17a thereof toward a downstream side. The intake duct 17 has a shape that gradually becomes flat as the intake duct 17 extends from the circular inflow opening 17a toward the downstream side. In the present embodiment, the intake duct 17 has a shape that increases in size in the upper-lower direction and decreases in size in the left-right direction as the intake duct 17 extends rearward from the inflow opening 17a.

Figure 4:
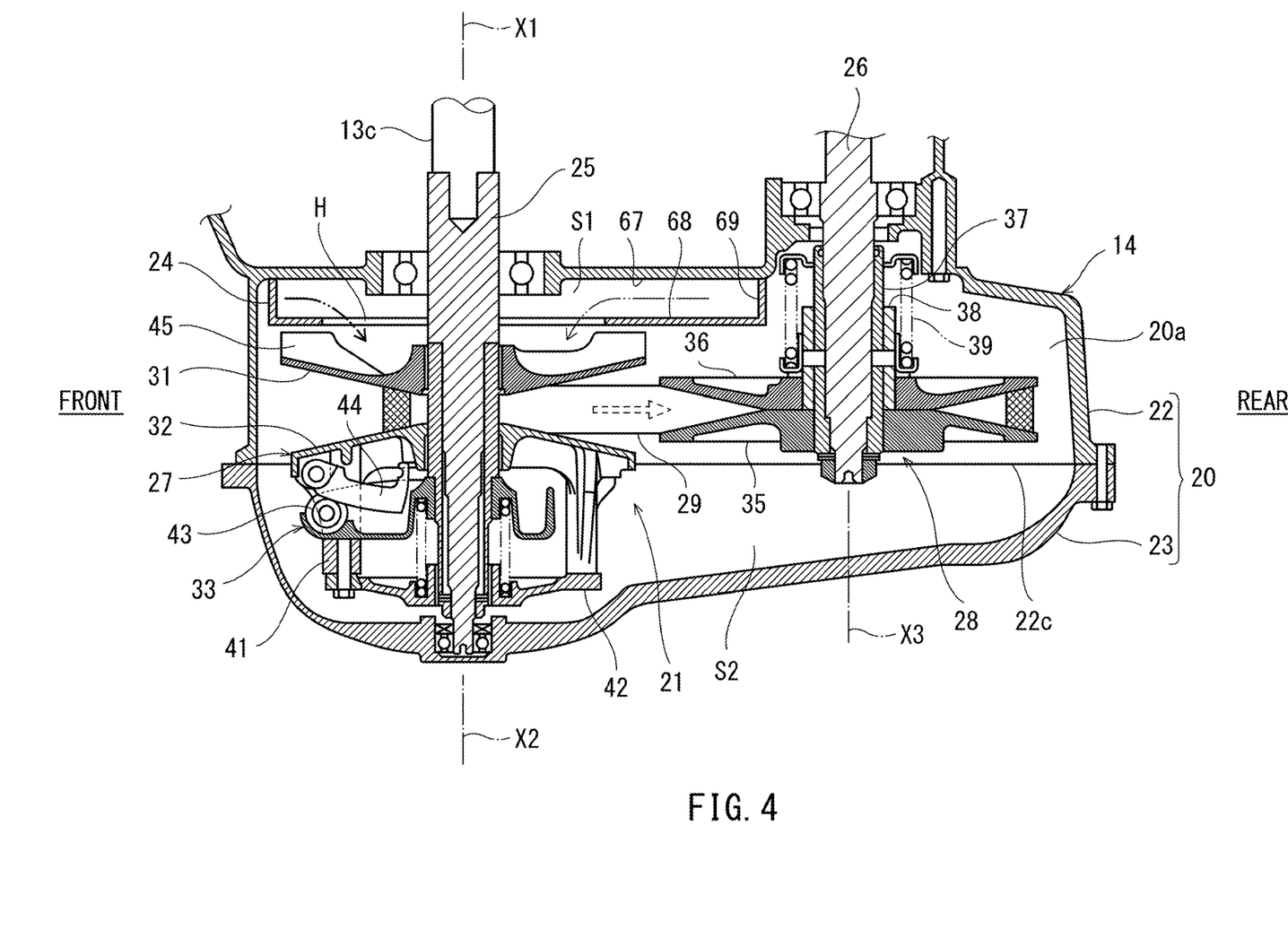
FIG. 4 is a horizontal sectional view of the continuously variable transmission of FIG. 3.

FIG. 4 is a horizontal sectional view of the continuously variable transmission 14 shown in FIG. 3. As shown in FIG. 4, the CVT mechanism 21 accommodated in the CVT case 20 includes an input shaft 25, an output shaft 26, a driving pulley 27, a driven pulley 28, and a belt 29. The input shaft 25 is connected to the crank shaft 13c on the same axis and receives rotational power from the prime mover 13. The output shaft 26 outputs the rotational power to driving wheels (the front wheels 3 and/or the rear wheels 4). The driving pulley 27 is disposed at the input shaft 25. The driven pulley 28 is disposed at the output shaft 26. The driving pulley 27 is arranged in front of the driven pulley 28. The belt 29 having a V shape is wound around the driving pulley 27 and the driven pulley 28. In the present embodiment, the crank shaft 13c and the input shaft 25 are directly coupled to each other, but a centrifugal clutch may be interposed between the crank shaft 13c and the input shaft 25.

The driving pulley 27 includes: a fixed sheave 31 fixed to the input shaft 25; a movable sheave 32 fitted to the input shaft 25 so as to be movable in the axial direction X2; and a sheave thruster 33 (for example, a flyweight type). The belt 29 is sandwiched between pressure surfaces of the fixed sheave 31 and the movable sheave 32. When the movable sheave 32 moves along the input shaft 25, and this changes an interval between the fixed sheave 31 and the movable sheave 32, a position, where the belt 29 is sandwiched, at the driving pulley 27 in a radial direction (direction orthogonal to the axis X2) of the driving pulley 27 changes (i.e., an effective diameter of the driving pulley 27 changes).

The sheave thruster 33 mechanically moves the movable sheave 32 relative to the fixed sheave 31 in accordance with a rotational frequency of the driving pulley 27 such that the movable sheave 32 approaches or separates from the fixed sheave 31 in the axial direction X2. The sheave thruster 33 includes a receiving plate 41, a coupling arm 42, a pressure receiving roller 43, and a flyweight 44. The receiving plate 41 is arranged at a back surface side of the movable sheave 32 and away from the movable sheave 32 in the axial direction X2. The pressure receiving roller 43 is supported by the receiving plate 41 through the coupling arm 42. The flyweight 44 is arranged at the back surface side of the movable sheave 32 and is supported by the movable sheave 32 while being in contact with the pressure receiving roller 43.

The flyweight 44 turns in a direction away from the movable sheave 32 by rotational centrifugal force of the driving pulley 27 to press the pressure receiving roller 43 in the axial direction X2 and moves the movable sheave 32 in a direction toward the fixed sheave 31 by reaction force from the pressure receiving roller 43. To be specific, by the rotational centrifugal force of the driving pulley 27, the sheave thruster 33 generates thrust that narrows the interval between the fixed sheave 31 and the movable sheave 32. A centrifugal fan blade 45 that generates swirling flow is disposed on a back surface of the fixed sheave 31.

The driven pulley 28 includes: a fixed sheave 35 fixed to the output shaft 26; and a movable sheave 36 fitted to the output shaft 26 so as to be movable in a direction (may be referred to as an axial direction X3) in which an axis X3 of the output shaft 26 extends. A cam cylinder 37 including spiral cam grooves is fixed to an outer peripheral surface of the output shaft 26. The cam cylinder 37 and the fixed sheave 35 rotate together with the output shaft 26. A sleeve 38 is integrally coupled to an inner peripheral end of the movable sheave 36. The sleeve 38 is fitted to an outer peripheral surface of the cam cylinder 37 so as to be movable in the axial direction X3 and supports a roller that is movable along the cam grooves of the cam cylinder 37.

The sleeve 38 is biased toward the fixed sheave 35 by a pressure regulating spring 39, and the movable sheave 36 is pressed toward the fixed sheave 35. When the movable sheave 36 receives rotational force by tensile force of the belt 29, thrust that moves the movable sheave 36 toward the fixed sheave 35 is generated by a cam action between the cam cylinder 37 and the roller.

When the rotational frequency of the input shaft 25 is low, the effective diameter of the driving pulley 27 is small, and the effective diameter of the driven pulley 28 is large (i.e., a reduction ratio is high). When the rotational frequency of the input shaft 25 increases, the movable sheave 32 approaches the fixed sheave 31 by the thrust of the sheave thruster 33 generated by the increase in centrifugal force, and this increases the effective diameter of the driving pulley 27. At the driven pulley 28, the tensile force of the belt 29 increases, and this increases force acting toward a radially inner side of the belt 29. Then, the movable sheave 36 moves in a direction away from the fixed sheave 35 against spring force of the pressure regulating spring 39 and cam thrust of the cam cylinder 37, and this decreases the effective diameter of the driven pulley 28 (i.e., the reduction ratio becomes low).

A partition 24 is disposed in the CVT case 20. The partition 24 extends in the radial direction of the driving pulley 27 and divides the internal space 20a into a first chamber S1 and a second chamber S2. The first chamber S1 communicates with the inflow openings 20b and 20c (see FIG. 3). The second chamber S2 communicates with the outflow opening 20d (see FIG. 3). The CVT mechanism 21 is arranged in the second chamber S2. The partition 24 includes a portion opposed to the centrifugal fan blade 45 in the axial direction X2. The partition 24 includes a communication opening H that is opposed to a radially inner portion of the centrifugal fan blade 45 and makes the first chamber S1 communicate with the second chamber S2. The axis X2 of the driving pulley 27 passes through the communication opening H.

Figure 5A:
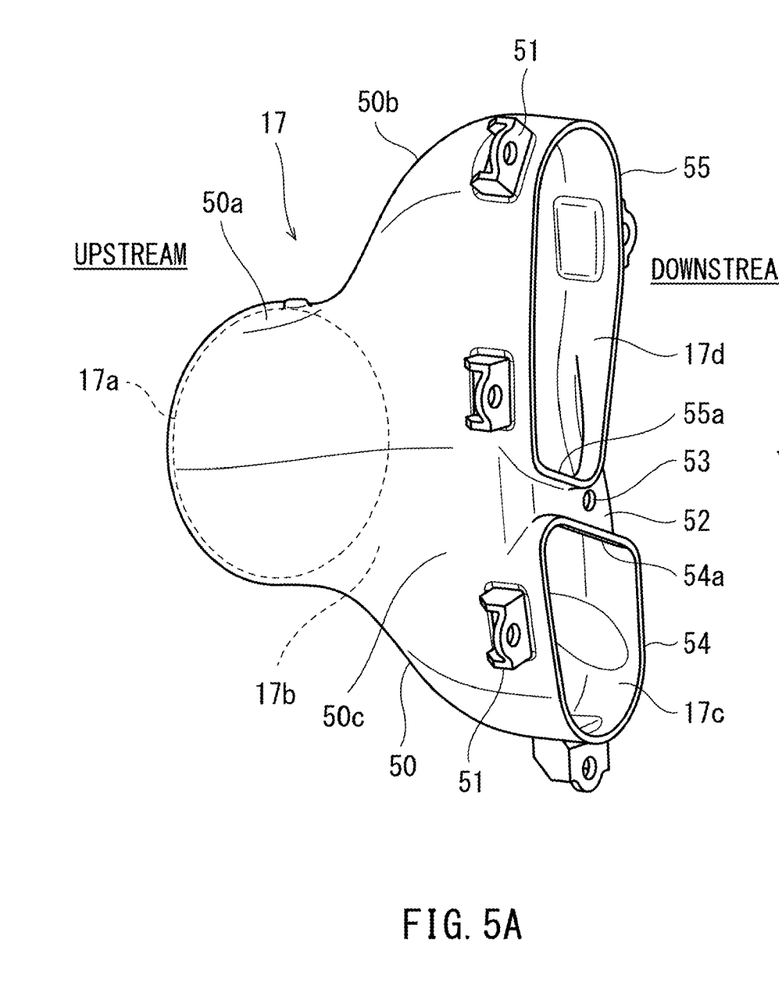
FIG. 5A is a perspective view of an intake duct of FIG. 3.
Figure 5B:
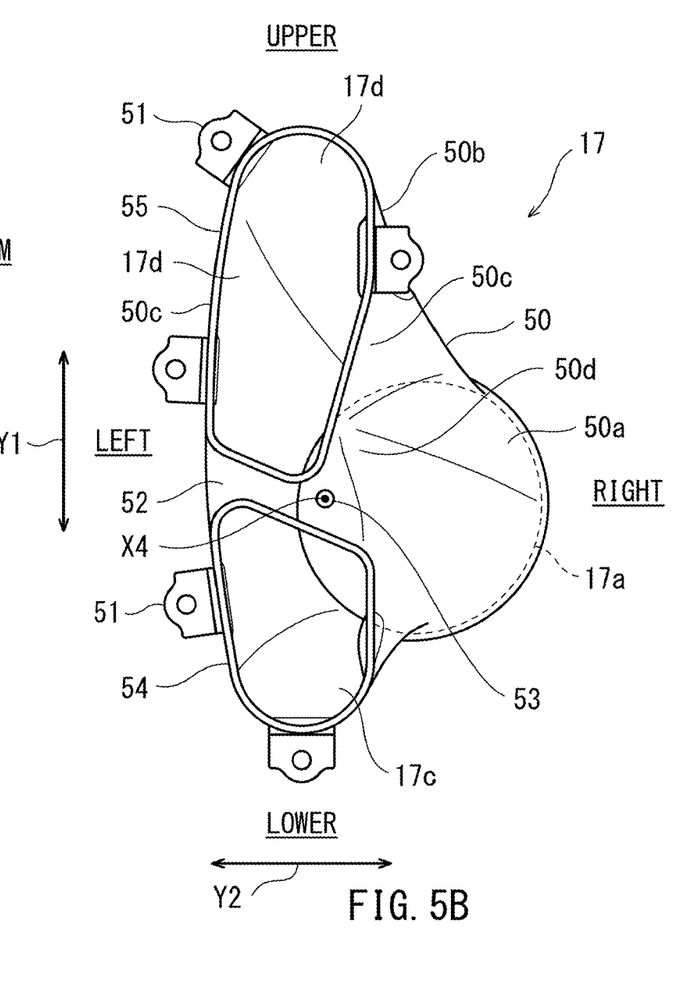
FIG. 5B is a rear view of the intake duct of FIG. 5A.

FIG. 5A is a perspective view of the intake duct 17 of FIG. 3. FIG. 5B is a rear view of the intake duct 17 of FIG. 5A. As shown in FIGS. 5A and 5B, the intake duct 17 includes the inflow opening 17a, a first outflow opening 17c, a second outflow opening 17d, and an intake passage 17b that makes the inflow opening 17a communicate with the first outflow opening 17c and the second outflow opening 17d. The intake duct 17 includes a peripheral wall 50 that defines the intake passage 17b. The peripheral wall 50 includes an upstream tube portion 50a and a downstream tube portion 50b. The upstream tube portion 50a has a substantially circular section when viewed from a flow direction of the intake duct 17. The downstream tube portion 50b has an elongated section that is long in the upper-lower direction when viewed from the flow direction of the intake duct 17. In the present embodiment, an outer shape of the downstream tube portion 50b is an oval shape when viewed from the downstream side. Fixing seats 51 project from an outer surface of the downstream tube portion 50b. The fixing seats 51 include respective fastening holes used to fix the intake duct 17 to the CVT case 20.

A pair of opposing wall portions 50c of the downstream tube portion 50b are opposed to each other in a transverse direction Y2 (left-right direction in the present embodiment) and are coupled to each other by a bridge 52 extending in the transverse direction Y2. A downstream opening of the downstream tube portion 50b is divided by the bridge 52 into the first outflow opening 17c and the second outflow opening 17d which are lined up in a longitudinal direction Y1 (upper-lower direction in the present embodiment) of the downstream tube portion 50b. To be specific, the first outflow opening 17c and the second outflow opening 17d are defined by the downstream tube portion 50b and the bridge 52. The number of bridges may be two or more such that the number of outflow openings of the intake duct becomes three or more. Or, the number of outflow openings of the intake duct may be only one without the bridge.

The bridge 52 includes a fastening hole 53 as a fixing structure used to fix the intake duct 17 to the CVT case 20. When viewed from a direction in which an axis X4 of the fastening hole 53 extends (see FIG. 5B), the fastening hole 53 is arranged at a position within the inflow opening 17a. Instead of the fastening hole 53, the fixing structure of the bridge 52 may be a structure that realizes the fixing by a locking operation. The bridge 52 is arranged at a position located upstream of a downstream end of the intake duct 17.

The intake duct 17 includes a first annular projection 54 and a second annular projection 55. The first annular projection 54 is continuous with the peripheral wall 50 and projects toward the downstream side so as to correspond to the first outflow opening 17c. The second annular projection 55 is continuous with the peripheral wall 50 and projects toward the downstream side so as to correspond to the second outflow opening 17d. The first annular projection 54 is arranged so as to surround the first outflow opening 17c when viewed from the downstream side of the intake duct 17. The second annular projection 55 is arranged so as to surround the second outflow opening 17d when viewed from the downstream side of the intake duct 17.

The first annular projection 54 and the second annular projection 55 project toward the downstream side beyond the bridge 52. The first annular projection 54 and the second annular projection 55 are continuous with the bridge 52. A portion of the first annular projection 54 which portion is adjacent to the bridge 52 serves as a rib 54a that projects from the bridge 52 toward the downstream side in the flow direction of the intake passage 17b. A portion of the second annular projection 55 which portion is adjacent to the bridge 52 serves as a rib 55a that projects from the bridge 52 toward the downstream side in the flow direction of the intake passage 17b.

The first annular projection 54 and the second annular projection 55 respectively serve as fitting projections 54 and 55 as fitting structures that are respectively fitted to a first annular groove 65 and a second annular groove 66 (fitted structures) of the below-described CVT case 20. To be specific, the first annular projection 54 and the second annular projection 55 are one example of two fitting structures that respectively correspond to the first outflow opening 17c and the second outflow opening 17d and are fitted to the CVT case 20. A relation between depressions and projections for the fitting of the intake duct 17 and the CVT case 20 may be reversed.

A portion of the outer surface of the downstream tube portion 50b which portion is directed toward a first side (right side in the present embodiment) in the axial direction X2 (see FIG. 2) includes a depressed portion 50d that is depressed toward a second side (left side in the present embodiment) in the axial direction X2. To be specific, the depressed portion 50d is depressed in a direction away from the prime mover 13 (see FIG. 2). Some of the accessories 19 (see FIG. 2) are arranged adjacent to the depressed portion 50d of the intake duct 17.

The intake duct 17 may be one piece made by integral molding using synthetic resin. The material of the intake duct 17 may be a material that is deformable more easily than the material of the case main body 22 of the CVT case 20. The thickness of the intake duct 17 may be smaller than the thickness of the case main body 22 of the CVT case 20.

Figure 6:
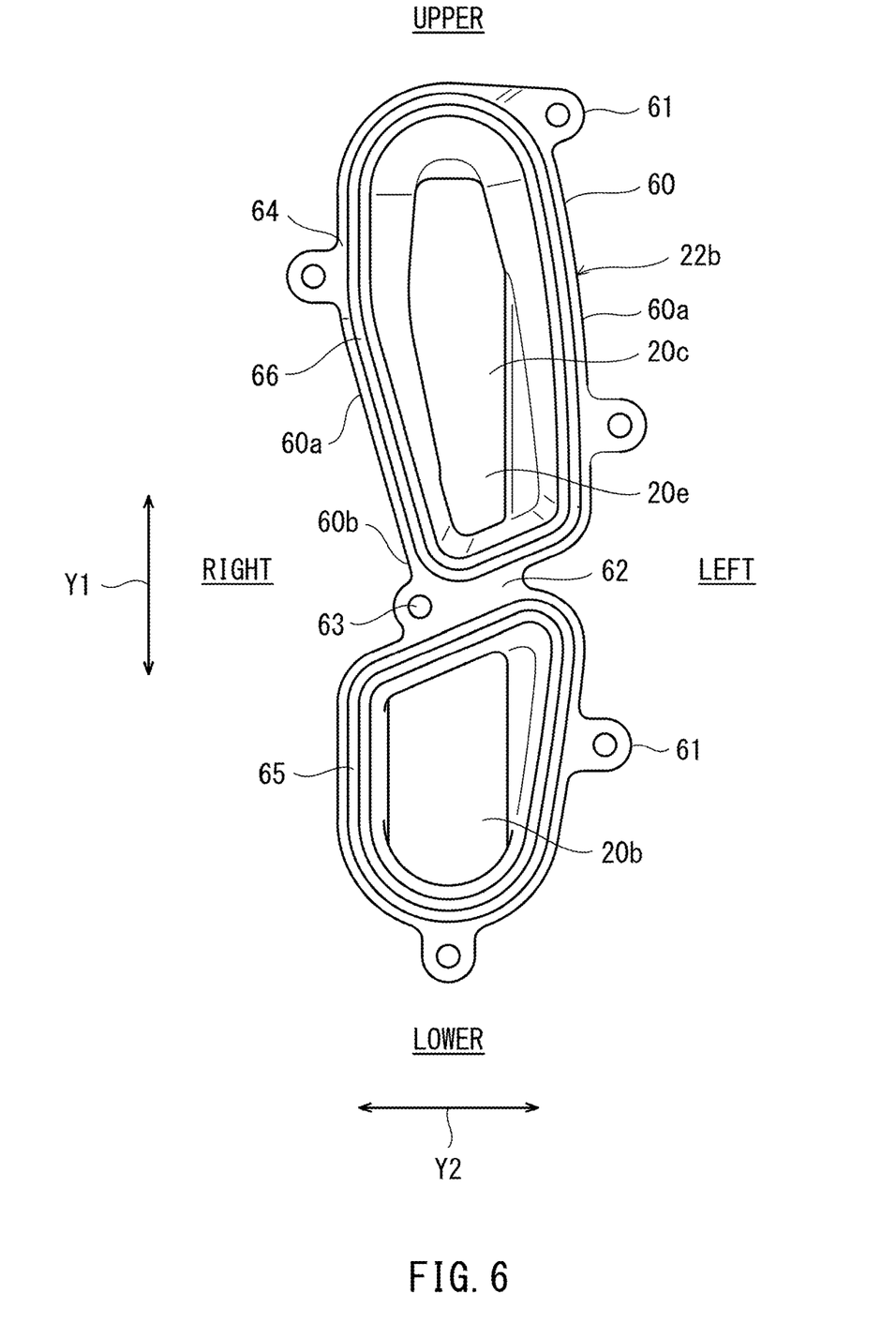
FIG. 6 is a front view of inflow openings of the continuously variable transmission of FIG. 3.

FIG. 6 is a front view of the inflow openings 20b and 20c of the continuously variable transmission 14 of FIG. 3. As shown in FIG. 6, the projecting portion 22b includes the first inflow opening 20b, the second inflow opening 20c, and the guide passage 20e. The first inflow opening 20b and the second inflow opening 20c are lined up in the longitudinal direction Y1 when viewed from a upstream side (front side in the present embodiment) of the projecting portion 22b. To be specific, a region at which the entirety of the first inflow opening 20b and the second inflow opening 20c is arranged and which is long in the upper-lower direction is arranged such that a transverse direction of the region extends along the axial direction X2 (see FIG. 3). In other words, the entirety of the first inflow opening 20b and the second inflow opening 20c has a maximum width and a minimum width smaller than the maximum width. The minimum width of the entirety of the first inflow opening 20b and the second inflow opening 20c is a width in the axial direction X2 (see FIG. 3).

The guide passage 20e guides the cooling air, flowing from the first inflow opening 20b and the second inflow opening 20c, to the internal space 20a of the CVT case 20. The projecting portion 22b includes a peripheral wall 60 that defines the guide passage 20e. The peripheral wall 60 has an elongated section that is long in the upper-lower direction when viewed from the flow direction at the projecting portion 22b. The transverse direction Y2 of the projecting portion 22b when viewed from the flow direction at the projecting portion 22b is a direction along the axial direction X2 (see FIG. 3). In the present embodiment, the peripheral wall 60 has a substantially oval shape when viewed from the upstream side. Fixing seats 61 including respective fastening holes used to fix the fixing seats 51 (see FIG. 5A) of the intake duct 17 project from an outer surface of the peripheral wall 60.

A pair of opposing wall portions 60a of the peripheral wall 60 are opposed to each other in the transverse direction Y2 and are coupled to each other by a bridge 62 extending in the transverse direction Y2. An upstream opening of the peripheral wall 60 is divided by the bridge 62 into the first inflow opening 20b and the second inflow opening 20c which are lined up in the longitudinal direction Y1. However, the upstream opening of the peripheral wall 60 does not have to be divided by the bridge, and the number of inflow openings of the CVT case 20 may be only one. In the present embodiment, the first inflow opening 20b and the second inflow opening 20c are open forward. To be specific, the first inflow opening 20b and the second inflow opening 20c are defined by the peripheral wall 60 and the bridge 62. The number of bridges may be two or more such that the number of inflow openings of the projecting portion 22b becomes three or more.

The bridge 62 includes a fastening hole 63 as a fixed structure to which the intake duct 17 is fixed. The fastening hole 63 of the bridge 62 of the CVT case 20 is arranged so as to coincide with the fastening hole 53 of the bridge 52 of the intake duct 17. Instead of the fastening hole 63, the fixed structure of the bridge 62 may be a structure that realizes the fixing by a locked operation.

An end surface 64 of the projecting portion 22b is opposed to the intake duct 17 and includes: the first annular groove 65 corresponding to the first inflow opening 20b; and the second annular groove 66 corresponding to the second inflow opening 20c. The first annular groove 65 is arranged so as to surround the first inflow opening 20b when viewed from the upstream side of the first inflow opening 20b. The second annular groove 66 is arranged so as to surround the second inflow opening 20c when viewed from the upstream side of the second inflow opening 20c. The first annular groove 65 and the second annular groove 66 serve as the fitted structures to which the first annular projection 54 and the second annular projection 55 of the intake duct 17 are fitted. Instead of forming the fitting structures of the intake duct 17 as projections and forming the fitted structures of the CVT case 20 as depressions, the fitting structures of the intake duct 17 may be formed as the depressions, and the fitted structures of the CVT case 20 may be formed as the projections.

A portion of the outer surface of the peripheral wall 60 of the projecting portion 22b which portion is directed toward the first side (right side in the present embodiment) in the axial direction X2 (see FIG. 2) includes a depressed portion 60b that is depressed toward the second side (left side in the present embodiment) in the axial direction X2. To be specific, the depressed portion 60b is depressed in a direction away from the prime mover 13 (see FIG. 2). Some of the accessories 19 (see FIG. 2) may be arranged adjacent to the depressed portion 60b of the projecting portion 22b.

Figure 7:
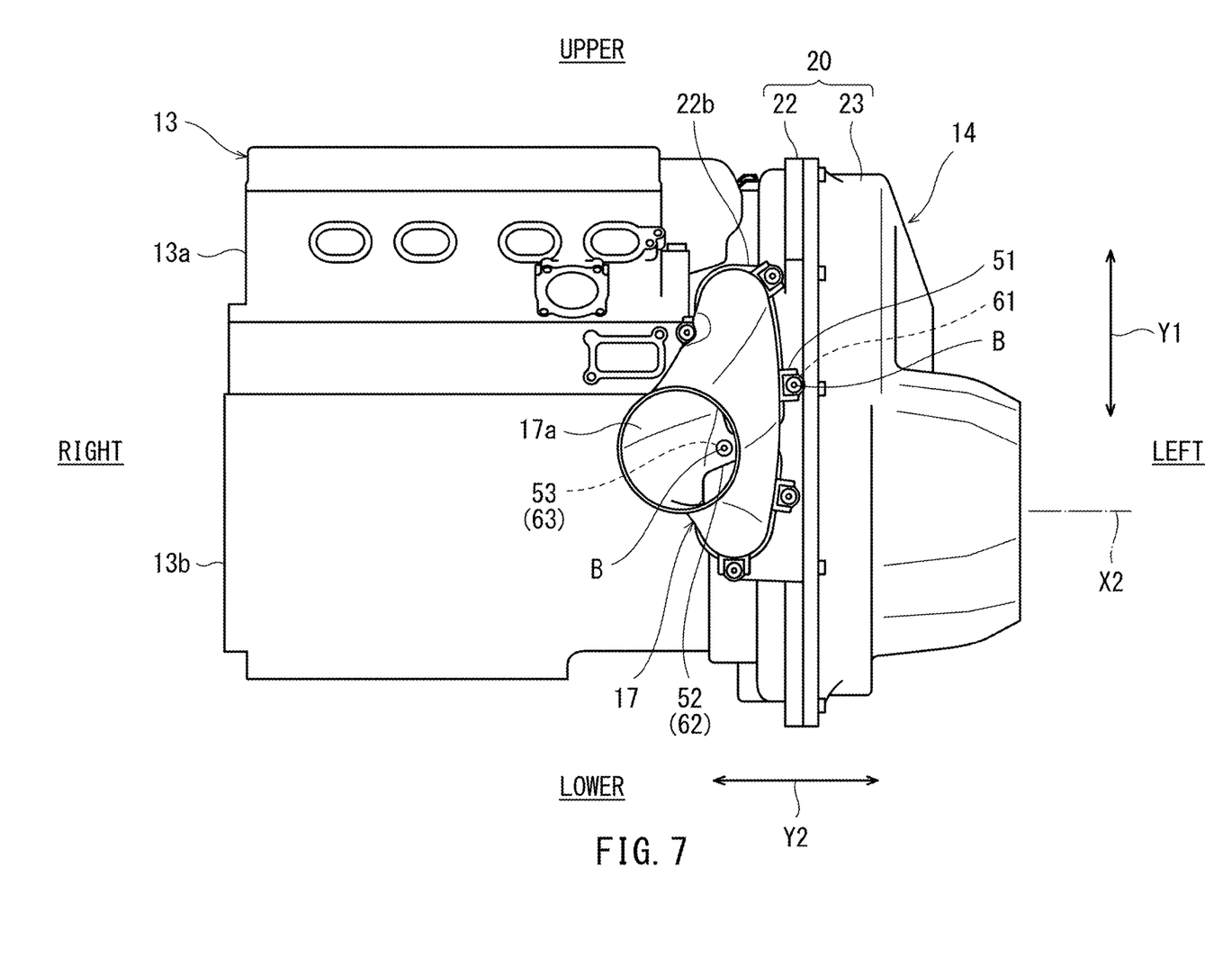
FIG. 7 is a front view when viewed from a direction indicated by an arrow VII of FIG. 2.

FIG. 7 is a front view when viewed from a direction indicated by an arrow VII of FIG. 2. As shown in FIG. 7, the intake duct 17 is fixed to the projecting portion 22b of the case main body 22 of the CVT case 20 from a front side. Specifically, the fixing seats 51 of the intake duct 17 are fastened to the fixing seats 61 of the projecting portion 22b of the case main body 22 by fasteners B. Moreover, by inserting the fastener B into the fastening hole 53 of the bridge 52 of the intake duct 17 and the fastening hole 63 of the bridge 62 of the projecting portion 22b, the bridges 52 and 62 are fastened to each other by the fastener B.

The inflow opening 17a of the intake duct 17 is arranged closer to the prime mover 13 than the downstream tube portion 50b of the intake duct 17 is (i.e., arranged at a right side of the downstream tube portion 50b of the intake duct 17 in the present embodiment). The fastening holes 53 and 63 are arranged such that the axis X4 passes through the inflow opening 17a of the intake duct 17. Therefore, work of inserting the fastener B into the fastening holes 53 and 63 through the inflow opening 17a is performed.

Figure 8:
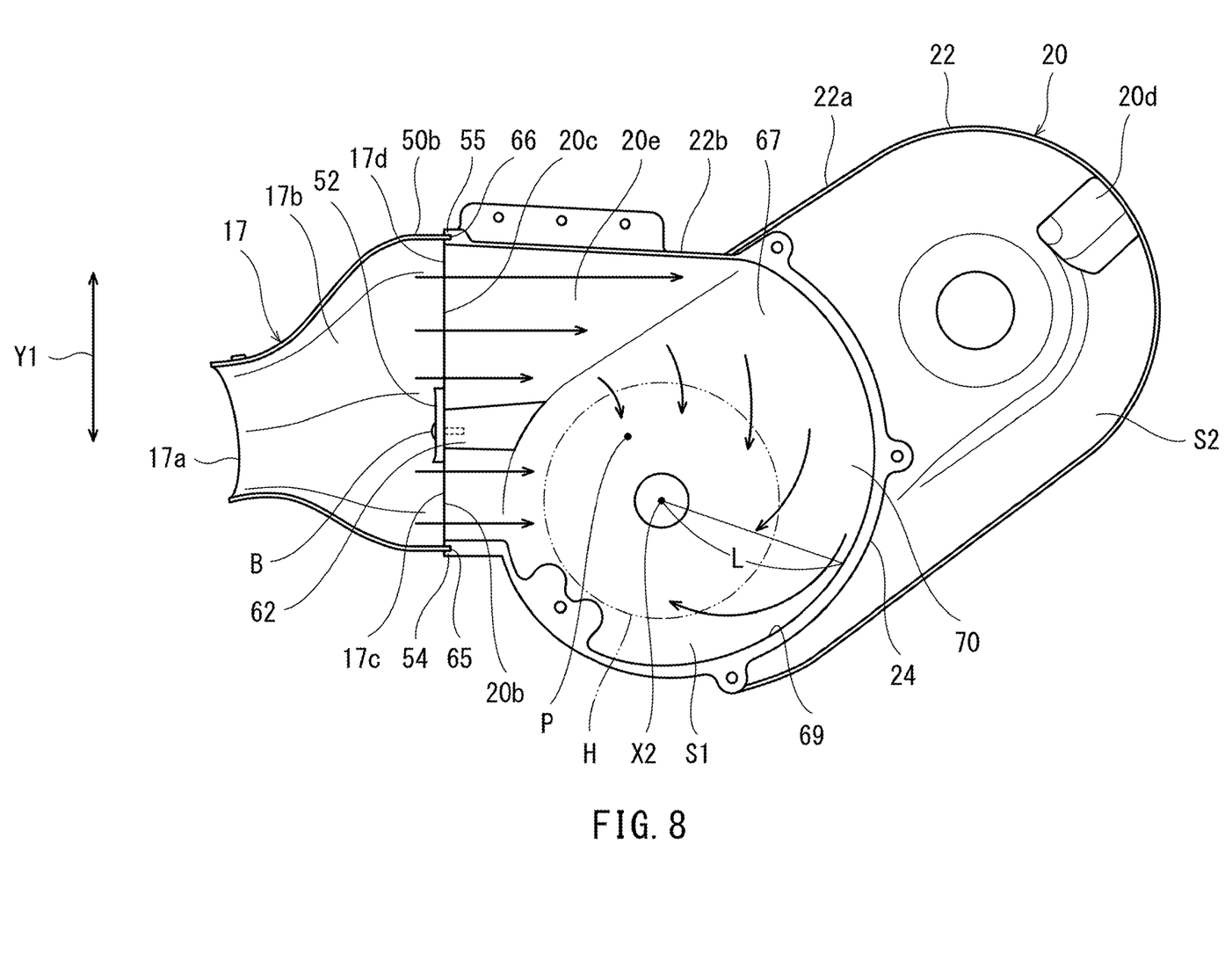
FIG. 8 is a longitudinal sectional view including a first chamber of the continuously variable transmission of FIG. 4.

FIG. 8 is a longitudinal sectional view including the first chamber S1 of the continuously variable transmission 14 of FIG. 4. As shown in FIG. 8, the first outflow opening 17c of the intake duct 17 communicates with the first inflow opening 20b of the CVT case 20, and the second outflow opening 17d of the intake duct 17 communicates with the second inflow opening 20c of the CVT case 20. The first chamber S1 of the internal space 20a of the CVT case 20 includes a curved portion 70 that, when viewed from the axial direction X2, spreads in a radial direction orthogonal to the axis X2 as the curved portion 70 extends toward the upstream side (toward the second inflow opening 20c) around the communication opening H of the partition 24. The curved portion 70 is arranged at an opposite side of the first inflow opening 20b and the second inflow opening 20c in the first chamber S1. The curved portion 70 may be referred to as a scroll portion. The curved portion 70 is arranged along a region of the communication opening H which region has an angle of 90 degrees or more around the axis X2.

The curved portion 70 is defined by a pair of side surfaces 67 and 68 (see FIG. 4 for the side surface 68) and an arc surface 69. The side surface 67 is an inner surface of the case main body 22 and is opposed to the first chamber S1 from one side in the axial direction X2. The side surface 68 is an inner surface of the case main body 22 and is opposed to the first chamber S1 from the other side in the axial direction X2. The pair of side surfaces 67 and 68 are arranged outside the communication opening H in the radial direction of the driving pulley 27 and are opposed to each other so as to be spaced apart from each other in the axial direction X2.

The arc surface 69 is a surface of the partition 24 and is opposed to the first chamber S1 from an outer side in a radial direction orthogonal to the axis X2. The arc surface 69 is a surface that covers a space between the pair of side surfaces 67 and 68 from the outer side in the radial direction and extends in a circumferential direction around the axis X2. The arc surface 69 is opposed to the first inflow opening 20b and the second inflow opening 20c. The arc surface 69 has such a shape that as the arc surface 69 extends away from the second inflow opening 20c in the circumferential direction, a distance L from the axis X2 to the arc surface 69 shortens. When the arc surface 69 has a circular-arc shape, a circular-arc center P of the arc surface 69 is located away from the axis X2 in the radial direction. The arc surface 69 does not have to have the circular-arc shape and may have an arc shape whose curvature continuously changes.

When viewed from the axial direction X2, the first outflow opening 17c of the intake duct 17 and the first inflow opening 20b of the CVT case 20 are directed toward the communication opening H of the partition 24. When viewed from the axial direction X2, the second outflow opening 17d of the intake duct 17 and the second inflow opening 20c of the CVT case 20 are directed toward the curved portion 70. To be specific, the upstream side of the curved portion 70 is directed toward the second inflow opening 20c.

In the intake duct 17, the second outflow opening 17d is larger than the first outflow opening 17c. In the projecting portion 22b, the second inflow opening 20c is larger than the first inflow opening 20b. In the intake duct 17, the second outflow opening 17d is longer than the first outflow opening 17c in the longitudinal direction Y1. In the projecting portion 22b, the second inflow opening 20c is longer than the first inflow opening 20b in the longitudinal direction Y1. When viewed from the axial direction X2, the first outflow opening 17c of the intake duct 17 is open toward the communication opening H of the partition 24, and the second outflow opening 17d is open toward a region located at a radially outer side of the communication opening H of the partition 24.

The cooling air flowing into the guide passage 20e from the first outflow opening 17c of the intake duct 17 and the first inflow opening 20b of the projecting portion 22b flows toward the communication opening H of the partition 24 and is sucked into the second chamber S2 (see FIG. 4) from the communication opening H. The cooling air flowing into the guide passage 20e from the second outflow opening 17d of the intake duct 17 and the second inflow opening 20c of the projecting portion 22b flows through the radially outer side of the communication opening H, flows through the curved portion 70 over a range that is wide in the circumferential direction of the communication opening H while being guided by the arc surface 69, and is sucked into the second chamber S2 (see FIG. 4) from the communication opening H.

Figure 9:
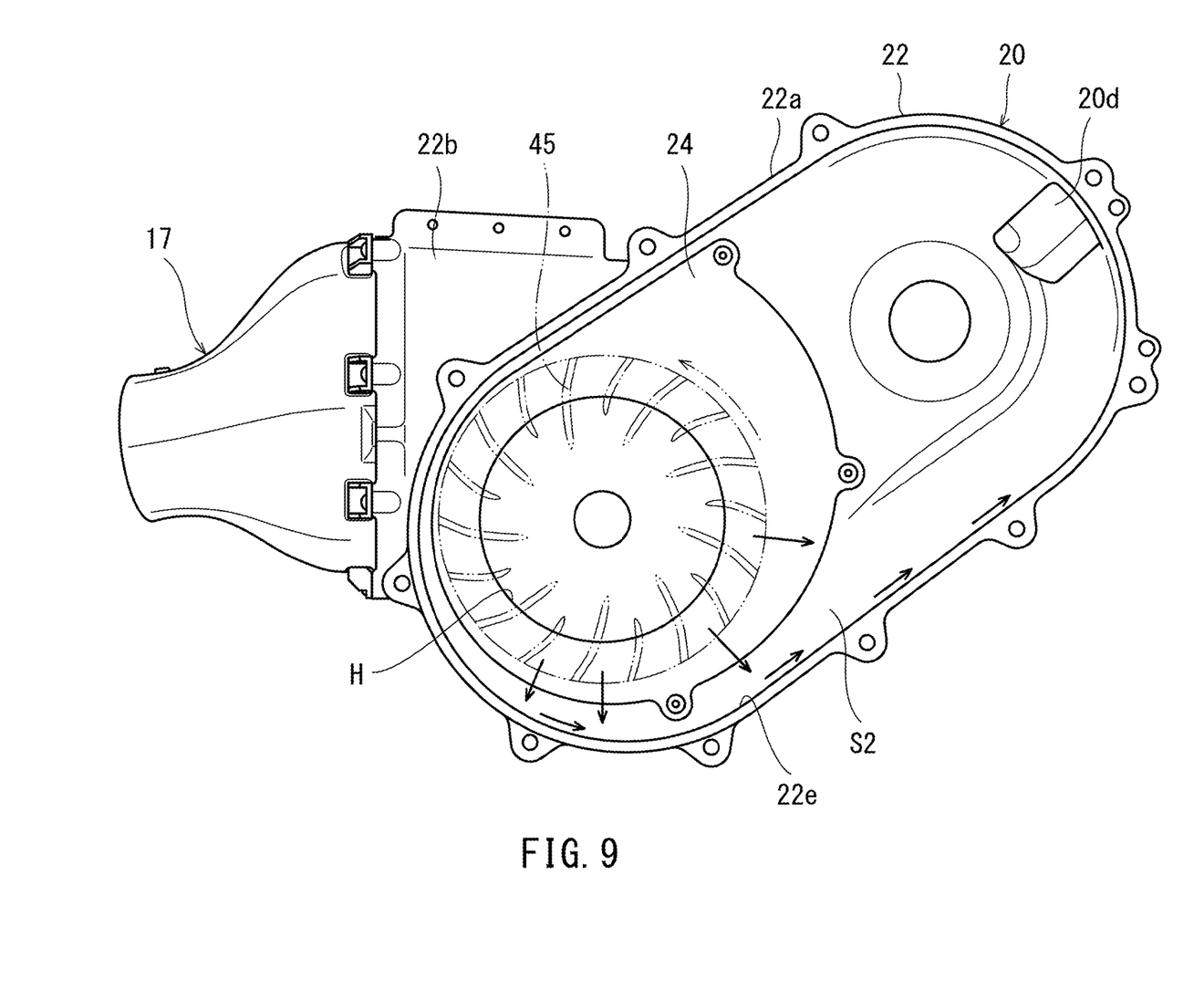
FIG. 9 is a longitudinal sectional view including a second chamber of the continuously variable transmission of FIG. 4.

FIG. 9 is a longitudinal sectional view including the second chamber S2 of the continuously variable transmission 14 of FIG. 4. As shown in FIG. 9, when the centrifugal fan blade 45 rotates by the rotation of the driving pulley 27 (see FIG. 4), the cooling air around the communication opening H is supplied outward in the radial direction and flows toward the outflow opening 20d along an inner peripheral surface of the case main body 22. Then, the cooling air which has cooled the belt 29 (see FIG. 4) and the like flows out from the outflow opening 20d and is discharged to the atmosphere through the exhaust duct 18 (see FIG. 3).

When the centrifugal fan blade 45 supplies the cooling air around the communication opening H outward in the radial direction, negative pressure is generated around the communication opening H in the second chamber S2, and the cooling air in the first chamber S1 (see FIG. 8) is sucked into the second chamber S2 through the communication opening H. A rotational direction (counterclockwise in FIG. 9) of the centrifugal fan blade 45 that rotates together with the driving pulley 27 (see FIG. 4) is a direction opposite to a swirling direction (clockwise in FIG. 8) in which the cooling air flows around the communication opening H toward the downstream side in the curved portion 70 (see FIG. 8).

According to the above-described configuration, since the outer shape of the downstream tube portion 50b of the peripheral wall 50 of the intake duct 17 is substantially flat, the degree of freedom of the arrangement of parts located adjacent to the downstream tube portion 50b in the transverse direction Y2 of the downstream tube portion 50b can be improved. In addition, the intake duct 17 includes two outflow openings 17c and 17d separated from each other by the bridge 52. Therefore, as compared to a case where one large outflow opening is disposed, the rigidity of the flat downstream tube portion 50b of the peripheral wall 50 can be improved while increasing the flow rate of the cooling air.

Since the bridge 52 of the intake duct 17 includes the fastening hole 53 that is the fixing structure fixed to the CVT case 20, the fixing structure does not have to be disposed outside the peripheral wall 50 at a position corresponding to the bridge 52. Therefore, the degree of freedom of the arrangement of the parts located adjacent to the intake duct 17 can be improved.

Since the axis X4 of the fastening hole 53 of the bridge 52 of the intake duct 17 passes through the inflow opening 17a, fastening work can be easily performed by inserting a tool into the inflow opening 17a of the intake duct 17.

Since the ribs 54a and 55a projecting in the flow direction of the intake passage 17b are disposed at the bridge 52 of the intake duct 17, the deformation of the bridge 52 can be prevented, and the rigidity of the bridge 52 can be improved.

Since the first annular projection 54 and the second annular projection 55 that are the fitting structures of the intake duct 17 are respectively fitted to the first annular groove 65 and the second annular groove 66 that are the fitted structures of the CVT case 20, the rigidity of an assembly including the intake duct 17 and the CVT case 20 can be improved, and the intrusion of foreign matters through between the intake duct 17 and the CVT case 20 can be prevented.

Since the transverse direction Y2 of the downstream tube portion 50b of the intake duct 17 is a direction along the axial direction X2 of the driving pulley 27, the driving source assembly 12 can be reduced in size in the axial direction X2.

Since the portion of the outer surface of the downstream tube portion 50b of the intake duct 17 which portion is directed toward the first side in the axial direction X2 includes the depressed portion 50d that is depressed toward the second side in the axial direction X2, the parts (for example, the accessories 19 for the prime mover 13) arranged at the first side of the depressed portion 50d in the axial direction X2 can be arranged close to the intake duct 17 while improving the rigidity of the intake duct 17 by the depressed portion 50d.

Since the first outflow opening 17c of the intake duct 17 is open toward the communication opening H of the partition 24 when viewed from the axial direction X2, the cooling air flowing into the first chamber S1 of the CVT case 20 from the first outflow opening 17c of the intake duct 17 can be smoothly guided to the communication opening H of the partition 24.

Since the second outflow opening 17d that is open toward the region located at the radially outer side of the communication opening H of the partition 24 when viewed from the axial direction X2 is longer than the first outflow opening 17c in the longitudinal direction Y1, the cooling air flowing into the first chamber S1 of the CVT case 20 from the second outflow opening 17d of the intake duct 17 can be dispersed widely in the circumferential direction of the communication opening H of the partition 24.

The driving pulley 27 is arranged in front of the driven pulley 28, and the first inflow opening 20b and the second inflow opening 20c of the CVT case 20 are open forward. The longitudinal direction Y1 of the downstream tube portion 50b of the intake duct 17 is the upper-lower direction, and the transverse direction Y2 is the left-right direction. Therefore, the cooling air supplied from the front side can be smoothly guided to the communication opening H of the partition 24.

Since the rigidity of the intake duct 17 is improved by the bridge 52, the deformation of the intake duct 17 is suppressed, and the generation of a gap between the intake duct 17 and the CVT case 20 is prevented. Therefore, even if a water surface reaches the vicinity of the seat surface 6a of the driver's seat 6, water and foreign matters can be prevented from getting into an intake route connected to the CVT case 20. Since the shape of the intake duct 17 contributes to the improvement of the rigidity, a light-weight material can be used as the material of the intake duct 17, and the intake duct 17 can be reduced in thickness.

Since the first chamber S1 of the CVT case 20 includes the curved portion 70 having such a shape that the curved portion 70 spreads in the radial direction as the curved portion 70 extends toward the upstream side, the cooling air flowing into the first chamber S1 from the second inflow opening 20c of the CVT case 20 flows in a range that is wide in the circumferential direction of the communication opening H at the radially outer side of the communication opening H of the partition 24. Therefore, the cooling air sucked into the second chamber S2 from the communication opening H is dispersed widely in the circumferential direction of the driving pulley 27, and this can effectively cool the CVT mechanism 21 including the belt 29.

Since the second inflow opening 20c of the CVT case 20 is directed toward the curved portion 70 when viewed from the axial direction X2, pressure loss of the flow of the cooling air can be reduced.

Since the first inflow opening 20b and the second inflow opening 20c of the CVT case 20 are lined up in a direction orthogonal to the axial direction X2, the flow rate of the cooling air flowing toward the curved portion 70 can be increased while making the CVT case thin.

Since the first inflow opening 20b and the second inflow opening 20c of the CVT case 20 are respectively directed toward the communication opening H and the curved portion 70 when viewed from the axial direction X2, the cooling air flowing into the first chamber S1 of the CVT case 20 can be smoothly guided to the communication opening H of the partition 24 while suppressing the pressure loss.

Since the second inflow opening 20c is larger than the first inflow opening 20b in the CVT case 20, the cooling air flowing into the first chamber S1 from the second inflow opening 20c can be guided widely in the circumferential direction of the communication opening H of the partition 24.

Since the peripheral wall 60 has such an elongated section that the transverse direction Y2 of the projecting portion 22b of the case main body 22 of the CVT case 20 extends along the axial direction X2, the cooling air flowing from the first inflow opening 20b and the second inflow opening 20c through the guide passage 20e into the first chamber S1 can be widely spread around the communication opening H.

Since a direction in which the cooling air flows toward the downstream side around the communication opening H in the curved portion 70 and a direction in which the driving pulley 27 rotates around the axis X2 are opposite to each other, the cooling air flowing from the first chamber S1 through the communication opening H into the second chamber S2 in the CVT case 20 can be suitably dispersed by the centrifugal fan blade 45.

Since the curved portion 70 of the first chamber S1 of the CVT case 20 is arranged along a region of the communication opening H which region has an angle of 90 degrees or more around the axis X2, the cooling air can be guided from the first chamber S1 toward the communication opening H at a wide angle.

Since the arc surface 69 defining the curved portion 70 has such a shape that the distance from the axis X2 to the arc surface 69 shortens as the arc surface 69 extends away from the second inflow opening 20c of the CVT case 20 in the circumferential direction, the cooling air flowing along the arc surface 69 can be smoothly guided to the communication opening H.

Since the circular-arc center P of the circular-arc arc surface 69 defining the curved portion 70 is located away from the axis X2 in the radial direction, the cooling air flowing along the arc surface 69 can be smoothly guided to the communication opening H.

Since the upstream side of the curved portion 70 is directed toward the second inflow opening 20c of the CVT case 20, part of the cooling air from the second inflow opening 20c easily flows along the arc surface 69, and therefore, the cooling air can flow in a range that is wide in the circumferential direction of the communication opening H.

In the utility vehicle 1, generally, torque transmitted to the continuously variable transmission 14 is relatively high, and the fluctuation of the torque is large. Therefore, the belt 29 is desired to be efficiently cooled. According to the above configuration, the cooling air easily cools the belt 29, and therefore, the temperature increase of the belt 29 can be suppressed.

The duct 17 shown in FIGS. 5A and 5B is used as an intake duct that guides the intake air to the CVT case 20 but may be used as an exhaust duct that discharges the cooling air from the inside of the CVT case 20 to the atmosphere. The intake duct 17 shown in FIGS. 5A and 5B is used as an intake duct that cools the CVT but may be used as an intake duct of an internal combustion engine or a duct that cools an electric motor. The intake duct 17 shown in FIGS. 5A and 5B may be used as an intake duct that cools not the continuously variable transmission but a belt of a belt reduction gear.

As above, the embodiment has been described as an example of the technology disclosed in the present application. However, the technology in the present disclosure is not limited to this and is also applicable to embodiments in which modifications, replacements, additions, omissions and the like are suitably made. Moreover, a new embodiment may be prepared by combining the components described in the above embodiment. For example, some of components or methods in an embodiment may be applied to another embodiment, and some of components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems.

What is claimed is:

1. A utility vehicle comprising:
a continuously variable transmission including a CVT mechanism and a CVT case that defines an internal space accommodating the CVT mechanism, the CVT mechanism including a driving pulley, a driven pulley, and a belt wound around the driving pulley and the driven pulley; and
an intake duct including an intake passage that guides cooling air to the internal space of the CVT case, wherein
the intake duct includes
a peripheral wall that includes a downstream tube portion having an elongated section and defines the intake passage,
a bridge that extends in a transverse direction of the downstream tube portion and couples a pair of opposing wall portions of the downstream tube portion to each other, the opposing wall portions being opposed to each other in the transverse direction, and
two outflow openings that are defined by the peripheral wall and the bridge and are lined up in a longitudinal direction of the downstream tube portion.

2. The utility vehicle according to claim 1, wherein the bridge including a fixing structure that is fixed to the CVT case.

3. The utility vehicle according claim 2, further comprising a fastener by which the intake duct is fastened to the CVT case, wherein:
the fixing structure is a fastening hole;
the CVT case includes a fastening hole that coincides with the fastening hole of the bridge; and
the fastener is inserted into the fastening hole of the bridge and the fastening hole of the CVT case.

4. The utility vehicle according to claim 1, wherein:
the intake duct further includes an inflow opening that communicates with the two outflow openings through the intake passage; and
an axis of the fastening hole of the bridge passes through the inflow opening.

5. The utility vehicle according to claim 1, wherein the bridge includes a rib that projects in a flow direction of the intake passage.

6. The utility vehicle according to claim 1, wherein the intake duct further includes two annular projections that are arranged so as to respectively correspond to the two outflow openings and project toward a downstream side beyond the bridge.

7. The utility vehicle according to claim 1, wherein:
a downstream end of the intake duct includes two fitting structures arranged so as to respectively correspond to the two outflow openings; and
the CVT case includes two fitted structures to which the two fitting structures of the intake duct are respectively fitted.

8. The utility vehicle according to claim 1, wherein the transverse direction is a direction along an axial direction of one of the driving pulley and the driven pulley.

9. The utility vehicle according to claim 8, further comprising a prime mover arranged at a first side of the continuously variable transmission in the axial direction, wherein
a portion of an outer surface of the downstream tube portion which portion is directed toward the first side in the axial direction includes a depressed portion that is depressed toward a second side in the axial direction.

10. The utility vehicle according to claim 8, wherein:
the continuously variable transmission further includes a partition that extends in a radial direction of the driving pulley and divides the internal space into a first chamber and a second chamber;
the partition includes a communication opening through which the first chamber communicates with the second chamber; and
when viewed from the axial direction, a first outflow opening of the two outflow openings of the intake duct is open toward the communication opening of the partition.

11. The utility vehicle according to claim 10, wherein:
when viewed from the axial direction, a second outflow opening of the two outflow openings of the intake duct is open toward a region located at a radially outer side of the communication opening of the partition; and
the second outflow opening is longer than the first outflow opening in the longitudinal direction.

12. The utility vehicle according to claim 8, wherein:
the continuously variable transmission further includes a partition that extends in a radial direction of the driving pulley and divides the internal space into a first chamber and a second chamber;
the driving pulley is arranged in front of the driven pulley;
the partition includes a communication opening through which an axis of the driving pulley passes and through which the first chamber communicates with the second chamber;
the CVT case includes two inflow openings that are open forward;
the two outflow openings of the intake duct respectively communicate with the two inflow openings of the CVT case;
the longitudinal direction is an upper-lower direction; and
the transverse direction is a left-right direction.

13. The utility vehicle according to claim 1, further comprising a seat on which a user is seated, wherein
the intake duct is arranged lower than a seat surface of the seat.

14. A fluid duct comprising:
a peripheral wall that includes a downstream tube portion having an elongated section and defines a fluid passage;
a bridge that extends in a transverse direction of the downstream tube portion and couples a pair of opposing wall portions of the downstream tube portion to each other, the opposing wall portions being opposed to each other in the transverse direction; and two outflow openings that are defined by the peripheral wall and the bridge and are lined up in a longitudinal direction of the downstream tube portion.

\* \* \* \* \*